United States Patent
Wang et al.

(10) Patent No.: US 6,882,527 B2
(45) Date of Patent: Apr. 19, 2005

(54) COMPUTER ENCLOSURE INCORPORATING DRIVE BRACKET

(75) Inventors: Liang-Chin Wang, Tu-chen (TW); Jian Hu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 171 days.

(21) Appl. No.: 10/413,897

(22) Filed: Apr. 14, 2003

(65) Prior Publication Data

US 2004/0075979 A1 Apr. 22, 2004

(30) Foreign Application Priority Data

Oct. 22, 2002 (TW) ........................................ 91216858 U

(51) Int. Cl.$^7$ ................................................. G06F 1/16
(52) U.S. Cl. ........................ 361/685; 361/684; 361/727; 312/223.2
(58) Field of Search .................... 361/683–686, 361/724–727, 737, 752; 312/223.1, 223.2, 270.1, 270.2, 309, 310, 311, 322; 360/137, 137 D, 97.01, 98.01; 292/31, 101, 106, 900; 70/57, 58, 59; 248/551, 553, 581, 60, 609, 611, 500, 346.03, 346.04, 229.16; 211/26, 189, 190, 150; 174/35 GC, 35 R

(56) References Cited

U.S. PATENT DOCUMENTS

| | | | | |
|---|---|---|---|---|
| 5,566,383 A | * | 10/1996 | Gildea et al. | ................ 361/685 |
| 5,680,293 A | * | 10/1997 | McAnally et al. | ........... 361/685 |
| 5,745,342 A | * | 4/1998 | Jeffries et al. | .............. 361/683 |
| 5,784,251 A | * | 7/1998 | Miller et al. | ................. 361/683 |
| 5,784,252 A | * | 7/1998 | Villa et al. | .................... 361/683 |
| 5,808,864 A | * | 9/1998 | Jung | ........................... 361/685 |
| 6,273,273 B1 | * | 8/2001 | Liao | ............................. 211/26 |
| 6,301,099 B1 | * | 10/2001 | Felcman et al. | ............ 361/683 |
| 6,318,823 B1 | * | 11/2001 | Liao | ........................ 312/223.2 |
| 6,388,876 B1 | * | 5/2002 | Chen | ........................... 361/685 |
| 6,392,875 B1 | * | 5/2002 | Erickson et al. | ............ 361/683 |
| 6,507,487 B1 | * | 1/2003 | Barina et al. | ................ 361/685 |
| 6,529,373 B1 | * | 3/2003 | Liao et al. | ................... 361/685 |
| 6,754,071 B1 | * | 6/2004 | Lin et al. | .................... 361/685 |
| 2002/0085347 A1 | * | 7/2002 | Erickson et al. | ............ 361/685 |

* cited by examiner

Primary Examiner—Michael Datskovsky
(74) Attorney, Agent, or Firm—Wei Te Chung

(57) ABSTRACT

A computer enclosure includes a drive bracket (10), a cage (20), a holder (30) attached to a side panel (21) of the cage, and a slider (40) secured to a lower bottom plate (15) of the drive bracket. The holder defines an arcuate groove (32) and a guide way (35) therein. The slider comprises a first shaft (42) and a second shaft (43). The drive bracket is pivotably installed in the cage. The drive bracket rotates relative to the cage, with the first shaft sliding and being tightly held within the groove, and the second shaft sliding and tightly pressing on the guide way. The drive bracket can be rotated relative to the cage and located in any desired position during such rotation.

21 Claims, 5 Drawing Sheets

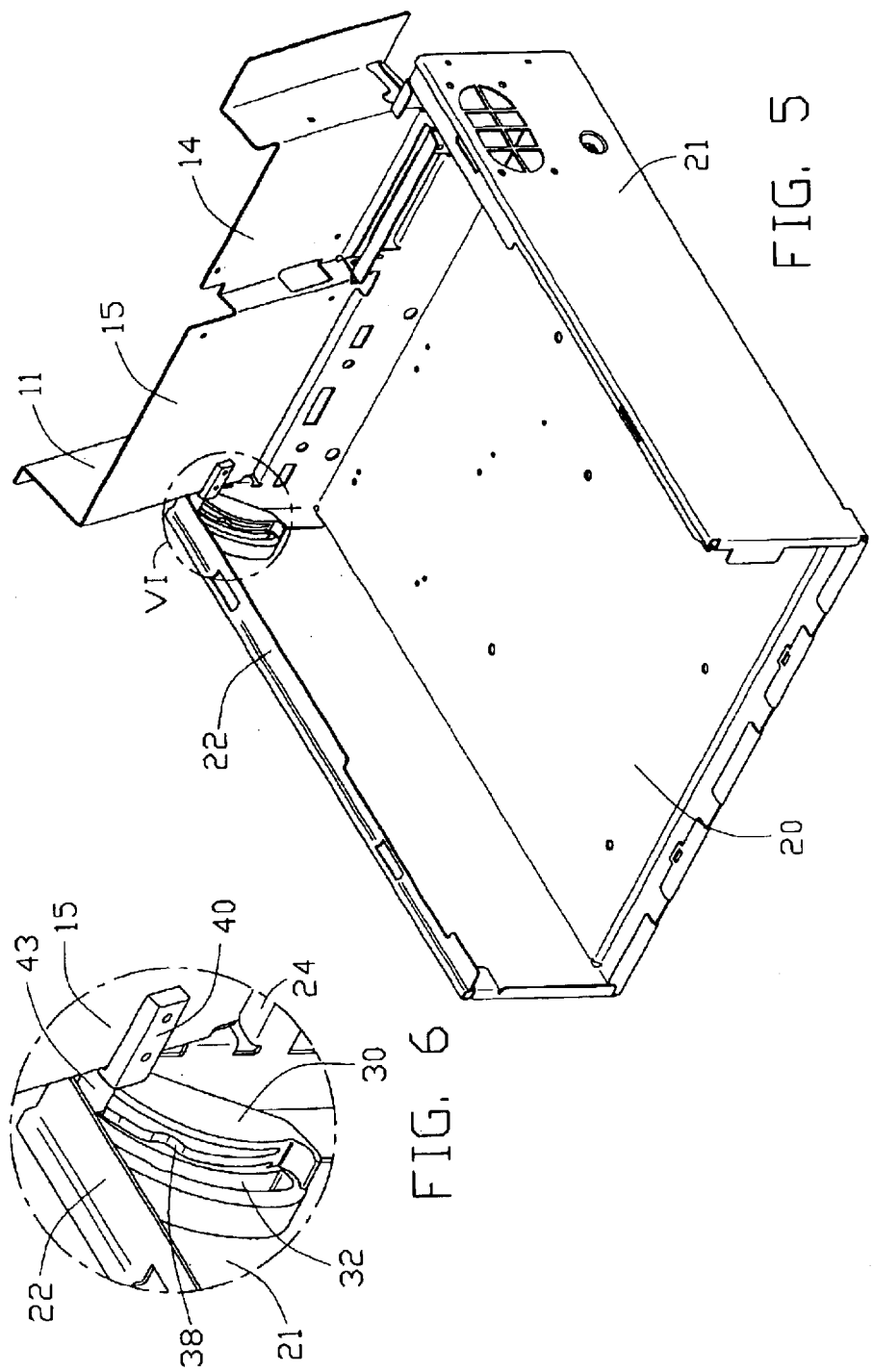

COMPUTER ENCLOSURE INCORPORATING DRIVE BRACKET

BACKGROUND OF THE INVENTION

1. Field of the Invention

The present invention relates to a computer enclosure, and more particularly to a computer enclosure incorporating a drive bracket which is pivotally installed and locatable in any position during rotation thereof.

2. Related Art

Various data storage devices are installed in computers for communication and handling of data. Such devices include, for example, hard disk drives, floppy disk drive, and CD-ROM drive.

In a conventional computer, a data storage device is attached in a drive bracket. The combined data storage device and drive bracket is then attached to a computer enclosure. The drive bracket is secured to the computer enclosure with screws. However, many components are compactly arranged in a limited space inside the computer enclosure. To remove data storage devices for maintenance or repairs, other components inside the enclosure are prone to be accidentally damaged during the removal operation.

Therefore, pivotable drive brackets have been developed. Taiwan Patent Application No. 88221950 discloses a pivotable drive bracket attaching a data storage device to a computer enclosure. The drive bracket has circular pivots on opposite sides thereof. The computer provides circular holes in a front panel thereof. The pivots can rotate in the holes to pivotally attach the storage device to the computer enclosure. However, the circular pivots in the circular holes can rotate as much as 360 degrees. No locating components are available during rotation, and therefore a user or an operator must hold the drive bracket with one hand while repairing or detecting malfunctions. This leads to a great deal of inconvenience.

An improved invention which solves these problems is desired.

SUMMARY OF THE INVENTION

Accordingly, a main object of the present invention is to provide a computer enclosure incorporating a drive bracket which is pivotally installed and locatable in any position during rotation thereof.

To achieve the above object, a computer enclosure includes a drive bracket, a cage, a holder attached to a side panel of the cage, and a slider secured to a lower bottom plate of the drive bracket. The holder defines an arcuate groove and a guide way therein. The slider comprises a first shaft and a second shaft. The drive bracket is pivotally installed in the cage. The drive bracket rotates relative to the cage, with the first shaft sliding and being tightly held within the groove, and the second shaft sliding and tightly pressing on the guide way. The drive bracket can be rotated relative to the cage and located in any desired position during such rotation.

Other objects, advantages and novel features of the present invention will be drawn from the following detailed description of preferred embodiments of the present invention with the attached drawings, in which:

BRIEF DESCRIPTION OF THE DRAWINGS

FIG. 5 is an assembled view of FIG. 1, showing a drive bracket located obliquely relative to a cage of the computer enclosure;

FIG. 6 is an enlarged view of an encircled portion VI of FIG. 5;

DESCRIPTION OF THE PREFERRED EMBODIMENT

Figure 1:
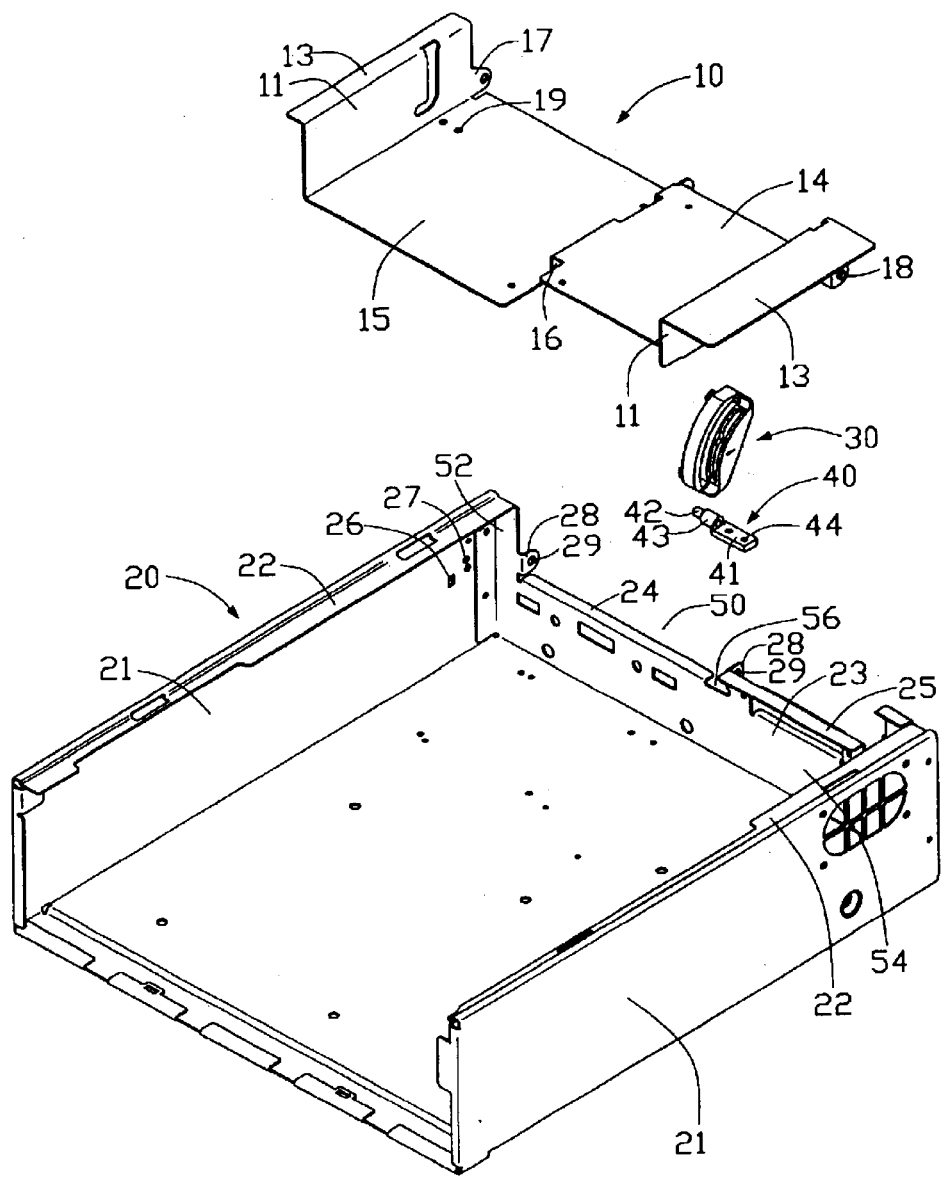
FIG. 1 is an exploded, isometric view of a computer enclosure in accordance with a preferred embodiment of the present invention.
Figure 4:
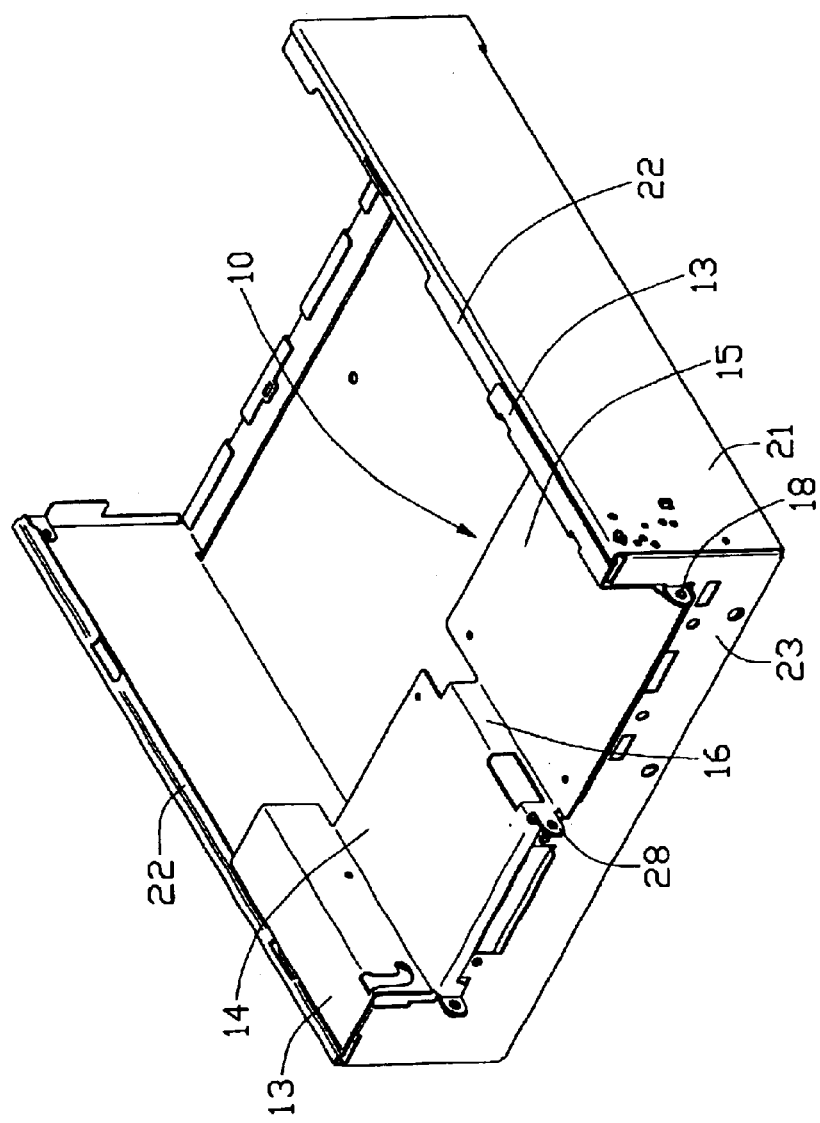
FIG. 4 is an assembled view of FIG. 1, but viewed from another aspect.

Referring to FIGS. 1, 4 and 5, a computer enclosure in accordance with the preferred embodiment of present invention comprises a drive bracket 10, a cage 20, a holder 30, and a slider 40. The drive bracket 10 is pivotally installed in the cage 20 and can be located during rotation thereof.

The drive bracket 10 comprises a pair of parallel side plates 11, an upper bottom plate 14, a lower bottom plate 15, and a partition plate 16 interconnecting the upper bottom plate 14 and the lower bottom plate 15. The partition plate 16 is parallel to the side plates 11. The side plates 11, upper and lower bottom plates 14, 15 and the partition plate 16 cooperatively define a pair of receiving spaces therebetween for respectively receiving a pair of data storage devices (not shown). Each side plate 11 comprises a first flange 13 extending perpendicularly outwardly from a top edge thereof. The side plates 11 and the partition plate 16 each form an ear 17 from a lower portion of a respective front edge thereof. A pivot pin 18 protrudes from a main face of each ear 17. A pair of first securing holes 19 is defined in the lower bottom plate 15 near the ear 17 of the adjacent side plate 11.

The cage 20 comprises a pair of parallel side panels 21, a front panel 23 and a bottom panel (not labeled). Each side panel 21 forms a second flange 22 extending perpendicularly inwardly from a top edge thereof. The second flanges 22 are for supporting the first flanges 13 of the drive bracket 13. A left one of the side panels 21 defines a plurality of fixing apertures 27 and a pair of fixing slots 26 (only one visible in FIG. 1) in a front portion thereof.

The front panel 23 defines an opening 50 in an upper portion thereof, thereby defining a pair of upright strips 52 at each of opposite ends of the opening 50 and a horizontal strip 54 below the opening 50. The opening 50 provides access for the drive bracket 10 to be received into the cage 20. The horizontal strip 54 forms an outward bent strip 24 and an inward bent strip 25 below the opening 50. The inward bent strip 25 is higher than the outward bent strip 24. The outward and inward bent strips 24, 25 are for supporting front portions of the upper and lower bottom plates 14, 15 of the drive bracket 10 respectively. The horizontal strip 54 further defines a cutout 56 therein between the bent strips 24, 25. Each upright strip 52 forms a tab 28 extending perpendicular outwardly therefrom. The horizontal strip 54 also forms a tab 28 extending outwardly therefrom at an outer side of the cutout 56. The tab 28 defines a pivot hole 29 therein, corresponding to a respective one of the pivot pins 18 of the drive bracket 10.

Figure 2:
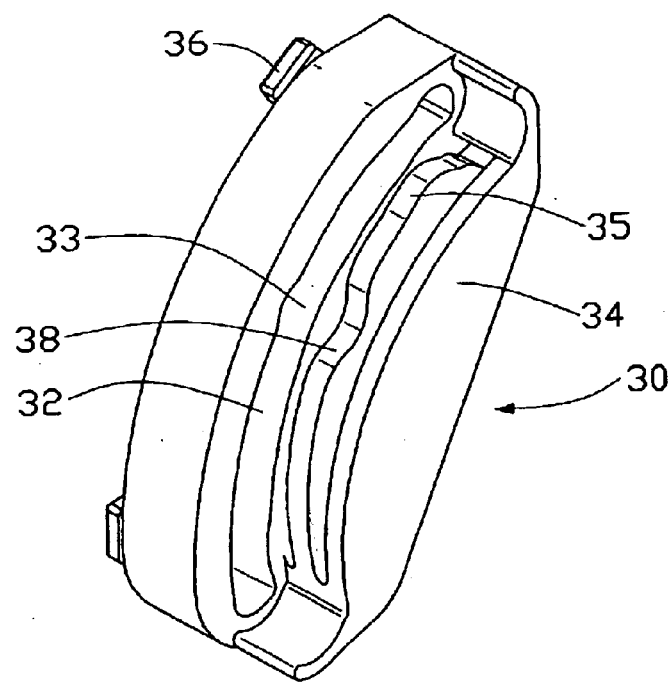
FIG. 2 is an enlarged, isometric view of a holder of the computer enclosure of FIG. 1.
Figure 3:
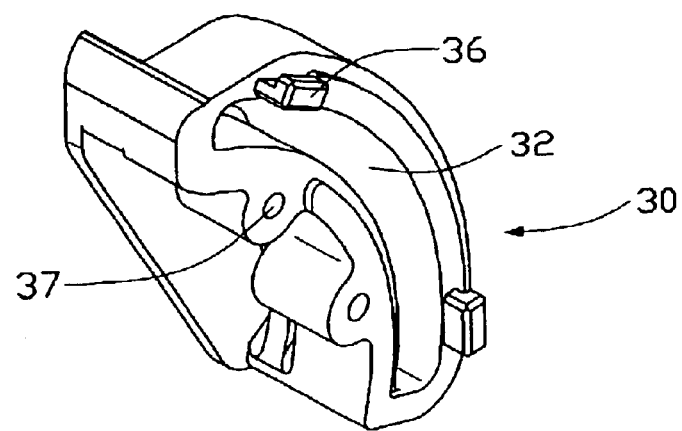
FIG. 3 is similar to FIG. 2, but viewed from another aspect.

The holder 30 is generally arcuate, and is secured to the left side panel 21 of the drive bracket 20. Referring to FIGS. 2 and 3, the holder 30 defines an arcuate groove 32 therein. The groove 32 spans substantially an entire length of the holder 30. The holder 30 forms a block 34 adjacent and slightly below the groove 32. The block 34 forms a guide way 35 on a surface thereof adjacent the groove 32. The holder 30 forms a pair of spaced hooks 36 at a longitudinal side thereof distal from the groove 32. A pair of fixing through holes 37 is defined in the holder 30 at a concave side of the groove 32. The groove 32 includes a medial notch 33 along a length thereof, for conveniently installing the slider 40 therein. The guide way 35 correspondingly defines a recess 38 therein. The holder 30 can be made from an elastic material such as PC (polycarbonate) with 10%~20% glass fiber or nylon with 10%~20% glass fiber. The groove 32 and the guide way 35 can cooperatively produce an elastic urging force.

The slider 40 is configured to be attached to the lower bottom plate 15 of the drive bracket 10. The slider 40 comprises a beam 41 defining a pair of connecting apertures 44 therein. The beam 41 connects with a second shaft 43 at an end thereof. A first shaft 42 coaxially extends from a distal end of the second shaft 43. The beam 41, the first shaft 42, and the second shaft 43 are integrally formed. A diameter of the first shaft 42 is less than a diameter of the second shaft 43, and slightly more than a width of the groove 32. A difference in diameters between the first and the second shafts 42, 43 is slightly greater than a distance from an inner extremity of the groove 32 to a nearest portion of the guide way 35. The slider 40 can be made from a rigid material such as POM (polyoxymethylene).

In assembly, the slider 40 is attached to the lower bottom plate 15 of the drive bracket 10. The connecting apertures 44 of the slider 40 are aligned with the securing holes 19 of the drive bracket 10. Fasteners (such as screws) are extended through the connecting apertures 44 and the securing holes 19 to secure the slider 40 to the lower bottom plate 15 of the drive bracket 10. The holder 30 is then secured to the left side panel 21 of the cage 20. The hooks 36 of the holder 30 are engaged in the fixing slots 26 of the cage 20. Fasteners such as screws are extended through the fixing apertures 27 of the cage 20 and engaged in the fixing through holes 37, thereby securing the holder 30 to the left side 21 of the cage 20. The drive bracket 10 is then installed into the cage 20. The first shaft 42 of the slider 40 is inserted into the notch 33 of the groove 32 and the second shaft 43 is received in the recess 38 of the guide way 35. The ears 17 of the drive bracket 10 are aligned with the tabs 28 of the cage 20, and the pivot pins 18 of the ears 17 are inserted into the pivot holes 29 of the tabs 28 to pivotally attach the drive bracket 10 to the cage 20.

The drive bracket 10 rotates about the pivot pins 18, with the first shaft 42 sliding in the groove 32 and the second shaft 43 sliding along the guide way 35. Opposite inner surfaces bounding the groove 32 can tightly hold the first shaft 42 of the slider 40 in any position during rotation of the drive bracket 10 relative to the cage 20, with the second shaft 43 being supported on the guide way 35.

Figure 7:
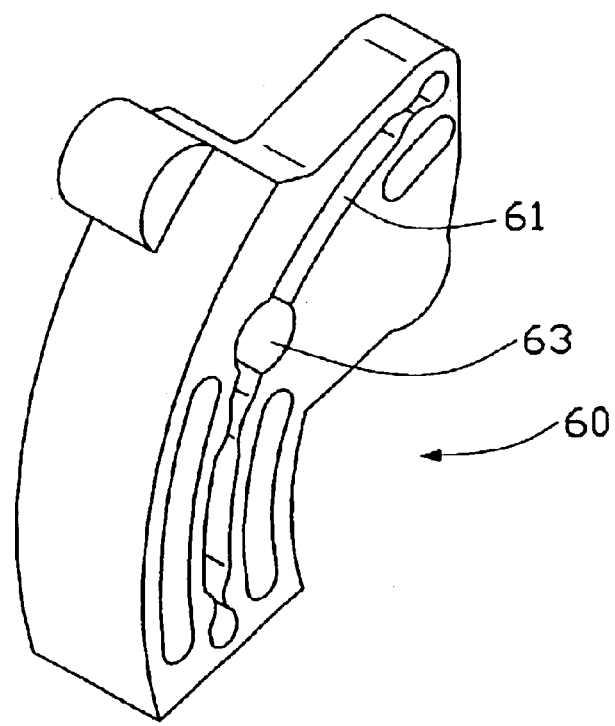
FIG. 7 is an isometric view of a holder in accordance with an alternative embodiment of the present embodiment.
Figure 8:
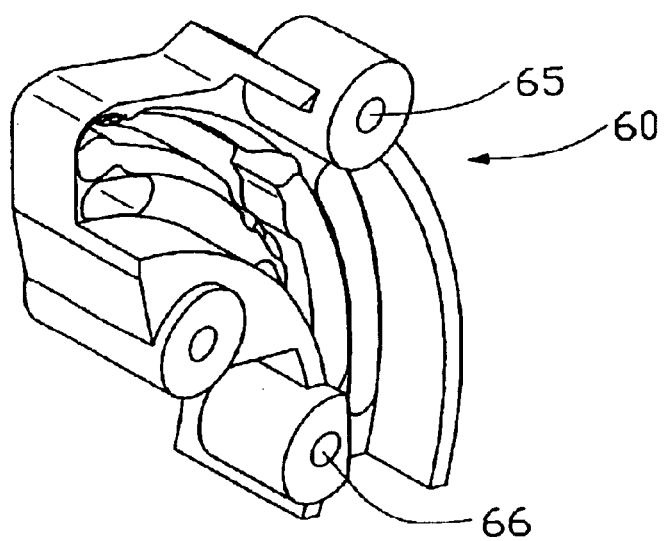
FIG. 8 is similar to FIG. 7, but viewed from another aspect.

FIGS. 7 and 8 show a holder 60 in accordance with an alternative embodiment of the present invention. The holder 60 can also be made from PC with 10%~20% glass fiber or nylon with 10%~20% glass fiber. The holder 60 defines a groove 61 therein. Opposite inner surfaces bounding the groove 61 can provide an elastic urging force to a shaft of a slider received therein. The groove 61 comprises a plurality of notches 63 along a length thereof for conveniently installing the slider 40 in the holder 60. The holder 60 defines a pair of fixing holes 66 at a concave side of the groove 61, and a fixing hole 65 at a convex side of the groove 61. Fasteners such as screws are extended into the fixing holes 65, 66 to secure the holder 60 to a side panel of a cage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A computer enclosure comprising:
   a cage comprising a pair of side plates and a front panel, the front panel defining an opening;
   a holder attached to the side panel of the cage, the holder defining a groove therein;
   a drive bracket pivotally installed in the cage; and
   a slider secured to a bottom plate of the drive bracket, the slider comprising a first shaft, a diameter of the first shaft being slightly greater than a width of the groove;
   wherein the first shaft is capable of sliding along the groove and being tightly held in any selected position in the groove, thereby locating the rotating bracket in desired position relative to the cage.

2. The computer enclosure as described in claim 1, wherein the holder is made from an elastic material, the slider is made form a rigid material.

3. The computer enclosure as described in claim 2, wherein the elastic material is polycarbonate with 10%~20% glass fiber or nylon with 10%~20% glass fiber, the rigid material is polyoxymethylene.

4. The computer enclosure as described in claim 1, wherein the drive bracket comprises a pair of side plates, a lower bottom plate and an upper bottom plate, a partition plate interconnecting the upper bottom plate and the lower bottom plate; the side plates, the bottom plates, and the partition plate cooperatively defining a pair of receiving spaces therebetween for respectively receiving a pair of data storage devices.

5. The computer enclosure as described in claim 4, wherein each of side plates comprises a first flange extends perpendicularly outwardly from a top edge thereof.

6. The computer enclosure as described in claim 5, wherein each of the side plates and the partition plate has an ear extending from a lower portion of a front edge thereof, and a pivot pin protrudes from the ear.

7. The computer enclosure as described in claim 6, wherein the cage comprises a pair of side panels, and each of the side panels has a second flange extending perpendicularly inwardly from a top edge thereof for supporting a corresponding first flanges of the drive bracket.

8. The computer enclosure as described in claim 7, wherein the cage further comprises a front panel, and the front panel defines an opening, thereby defining a pair of upright strips at opposite sides of the opening and a horizontal strip below the opening.

9. The computer enclosure as described in claim 8, wherein each of the upright strips and the horizontal strip comprises a tab extending outwardly, and a pivot hole is defined in each of the tabs.

10. The computer enclosure as described in claim 9, wherein the side panel defines a pair of fixing apertures and pair of slots in a front portion thereof.

11. The computer enclosure as described in claim 10, wherein the holder comprises a pair of hooks engaging in the fixing slots and a pair of fixing hole corresponding to the fixing apertures.

12. The computer enclosure as described in claim 1, wherein the holder comprises a guide block below the groove, the guide block forms a guide way on a surface thereof, and the slider comprises a second shaft slidably abutting against the guide way.

13. The computer enclosure as described in claim 12, wherein the groove of the holder includes a notch, and the guide way defines a recess therein corresponding to the notch.

14. A pivot assembly for pivotally locating a drive bracket in a cage, comprising:

a holder attached to the cage, the holder being made of an elastic material comprising and defining an arcuate groove and a guide way;

a slider fixing to a bottom of the drive bracket, the slider comprising a first shaft received in the groove and a second shaft abutting against the guide way, a diameter of the first shaft being slightly greater than a width of the groove;

wherein the first shaft is capable of sliding in the groove, the second shaft is capable of sliding along the guide way, and the first shaft is capable of being tightly held in any selected position in the groove to locate the bracket in any desired position relative to the cage.

15. The pivot assembly as described in claim 14, wherein the holder is made from polycarbonate with 10%~20% glass fiber or nylon with 10%~20% glass fiber.

16. The pivot assembly as described in claim 15, wherein the slider is made from a rigid material.

17. The pivot assembly as described in claim 16, wherein the slider is made from polyoxymethylene.

18. The pivot assembly as described in claim 16, wherein the groove of the holder includes a notch and the guide way correspondingly defines a recess therein, for installing of the slider into the holder.

19. A computer enclosure comprising:

a cage;

a drive bracket pivotally mounted to the cage;

a pivotal axis commonly defined by both said cage and said drive bracket;

a holder fixed to the cage and defining an arcuate groove with a curved guiding way located aside along a direction parallel to said pivotal axis; and a slider provided on the drive bracket around said pivotal axis, said slider including concentric first and second shafts, said first shaft being offset from said second shaft in said direction, wherein said first shaft is receiveably moved along said arcuate groove while said second shaft is supportably moved along said curved guiding way, and wherein at least one of said arcuate groove and said curved guiding way defines interengaging means around an intermediate position thereof to allow at least a corresponding one of said first and second shafts retained in a mid-position with regard to a whole moving path provided by said slider.

20. The enclosure as described in claim 19, wherein said first shaft is diametrically smaller than the second shaft.

21. A computer enclosure comprising:

a cage;

a drive bracket pivotally mounted to the cage;

a pivotal axis commonly defined by both said cage and said drive bracket;

a holder fixed to the cage and defining an arcuate groove; and a slider provided on the drive bracket around said pivotal axis and defining thereof a shaft extending in a direction parallel to said pivotal axis, wherein when the drive bracket is moved relative to the case by rotation about the pivotal axis, said shaft is receiveably moved along said arcuate groove with an interengaging means formed around a mid-position of said groove to retain the shaft thereto so as to keep the drive bracket in a specific angle position.

\* \* \* \* \*